(12) United States Patent
Brennan

(10) Patent No.: US 7,516,483 B2
(45) Date of Patent: Apr. 7, 2009

(54) SYSTEM AND METHOD FOR ACCOMPLISHING TWO-FACTOR USER AUTHENTICATION USING THE INTERNET

(75) Inventor: Sean Brennan, Merrimac, MA (US)

(73) Assignee: Secure Computing Corporation, San Jose, CA (US)

( * ) Notice: Subject to any disclaimer, the term of this patent is extended or adjusted under 35 U.S.C. 154(b) by 0 days.

(21) Appl. No.: 11/678,921

(22) Filed: Feb. 26, 2007

(65) Prior Publication Data

US 2007/0136799 A1 Jun. 14, 2007

Related U.S. Application Data

(62) Division of application No. 10/050,752, filed on Jan. 16, 2002.

(60) Provisional application No. 60/314,810, filed on Aug. 24, 2001.

(51) Int. Cl.
*G06F 7/04* (2006.01)
*G06F 15/16* (2006.01)
*H04L 9/32* (2006.01)
*G06F 17/30* (2006.01)
*H04K 1/00* (2006.01)

(52) U.S. Cl. .................. 726/9; 713/184; 713/185; 713/186; 713/159; 713/172; 715/742; 709/229

(58) Field of Classification Search ............ 713/184, 713/159, 185, 186, 172; 715/741, 742; 726/9; 709/229
See application file for complete search history.

(56) References Cited

U.S. PATENT DOCUMENTS

| 4,720,860 A | 1/1988 | Weiss |
|---|---|---|
| 4,998,279 A | 3/1991 | Weiss |
| 5,280,527 A | 1/1994 | Gullman et al. |
| 5,475,758 A | 12/1995 | Kikuchi |
| 5,657,388 A | 8/1997 | Weiss |
| 5,850,442 A | 12/1998 | Muftic |
| 6,199,113 B1 * | 3/2001 | Alegre et al. ............... 709/229 |
| 6,246,770 B1 | 6/2001 | Stratton et al. |
| 6,263,432 B1 | 7/2001 | Sasmazel et al. |
| 6,317,838 B1 | 11/2001 | Baize |

(Continued)

FOREIGN PATENT DOCUMENTS

EP 1089516 A2 4/2001

(Continued)

OTHER PUBLICATIONS

"IBM Technical Disclosure Bulletin NNRD429128", *IBM*, (Jan. 2000).

(Continued)

*Primary Examiner*—Michael J Simitoski
(74) *Attorney, Agent, or Firm*—Schwegman, Lundberg & Woessner, P.A.

(57) ABSTRACT

A method of accomplishing two-factor user authentication, comprising providing two separate user authentication methods, enabling a user to communicate authentication data for both authentication methods to a first web site using the internet, and enabling the communication of at least some of the authentication data from the first web site to a second web site also using the internet. Both web sites are thus involved in user authentication using the authentication data.

25 Claims, 8 Drawing Sheets

U.S. PATENT DOCUMENTS

| | | |
|---|---|---|
| 6,418,225 B2 | 7/2002 | Stratton et al. |
| 6,466,917 B1 | 10/2002 | Goyal et al. |
| 6,481,621 B1 | 11/2002 | Herrendoerfer et al. |
| 6,490,624 B1 | 12/2002 | Sampson et al. |
| 6,499,109 B1 | 12/2002 | Balasubramaniam et al. |
| 6,510,236 B1 | 1/2003 | Crane et al. |
| 6,523,027 B1 | 2/2003 | Underwood |
| 6,549,773 B1 | 4/2003 | Linden et al. |
| 6,601,233 B1 | 7/2003 | Underwood |
| 6,607,136 B1 | 8/2003 | Atsmon et al. |
| 6,609,128 B1 | 8/2003 | Underwood |
| 6,633,878 B1 | 10/2003 | Underwood |
| 6,662,228 B1 * | 12/2003 | Limsico .................. 709/225 |
| 6,704,873 B1 | 3/2004 | Underwood |
| 6,718,535 B1 | 4/2004 | Underwood |
| 6,853,980 B1 | 2/2005 | Ying et al. |
| 6,853,988 B1 | 2/2005 | Dickinson et al. |
| 6,892,307 B1 | 5/2005 | Wood et al. |
| 2001/0005886 A1 | 6/2001 | Stratton et al. |
| 2001/0032175 A1 | 10/2001 | Holden et al. |
| 2001/0037466 A1 | 11/2001 | Fukutake et al. |
| 2001/0044896 A1 | 11/2001 | Schwartz et al. |
| 2001/0045451 A1 | 11/2001 | Tah et al. |
| 2002/0010679 A1 | 1/2002 | Felsher |
| 2002/0032668 A1 | 3/2002 | Kohler et al. |
| 2002/0049806 A1 | 4/2002 | Gatz et al. |
| 2002/0059531 A1 | 5/2002 | Lai On |
| 2002/0067832 A1 | 6/2002 | Jablon |
| 2002/0069174 A1 | 6/2002 | Fox et al. |
| 2002/0073057 A1 | 6/2002 | Benoit et al. |
| 2002/0077837 A1 | 6/2002 | Krueger et al. |
| 2002/0078152 A1 | 6/2002 | Boone |
| 2002/0152395 A1 | 10/2002 | Zhang et al. |
| 2003/0028495 A1 | 2/2003 | Pallante |
| 2004/0172531 A1 | 9/2004 | Little et al. |
| 2005/0015588 A1 | 1/2005 | Lin et al. |
| 2005/0036615 A1 | 2/2005 | Jakobsson et al. |
| 2005/0091492 A1 | 4/2005 | Benson et al. |

FOREIGN PATENT DOCUMENTS

| | | |
|---|---|---|
| WO | WO-0122650 A2 | 3/2001 |
| WO | WO-0133359 A1 | 5/2001 |
| WO | WO-0172009 A2 | 9/2001 |

OTHER PUBLICATIONS

"RSA Web Security Portfolio—How RSA SecurID Agents Can Secure Your Website", *RSA Security, Inc*, (Aug. 2000).

Aladdin, "eToken: Implementing Corporate and e-Commerce Security Using Strong Authentication", (Mar. 2000).

Aladdin, "eToken: The Key to Security for the Internet Age", (Jul. 2000).

Mudge, K , "Initial Cryptanalysis of the RSA SecurID Algorithm", www.atstake.com,(Jan. 2001).

Stallings, W. , "Network Security Essentials Applications and Standards", *Prentice-HAll, Inc*, (2000),203-223.

Weiss, K. P., "When a Password Is Not a Password", *IEEE*, (1990).

"U.S. Appl. No. 10/050,752, Advisory Action mailed Oct. 26, 2006", 2 pgs.

"U.S. Appl. No. 10/050,752, Advisory Action mailed Aug. 3, 2006", 3 pgs.

"U.S. Appl. No. 10/050,752, Final Office Action mailed Apr. 14, 2006", 12 pgs.

"U.S. Appl. No. 10/050,752, Non Final Office Action mailed Sep. 8, 2005", 9 pgs.

"U.S. Appl. No. 10/050,752, Response filed Mar. 8, 2006 to Non Final Office Action mailed Sep. 8, 2005", 12 pgs.

"U.S. Appl. No. 10/050,752, Response filed Jul. 14, 2006 to Final Office Action mailed Apr. 14, 2008", 9 pgs.

"U.S. Appl. No. 10/050,752, Response filed Aug. 18, 2008 to Appeal Decision mailed Jun. 16, 2008", 11 pgs.

"U.S. Appl. No. 10/050,752, Non-Final Office Action mailed Oct. 24, 2008.", 12 pgs.

\* cited by examiner

SYSTEM AND METHOD FOR ACCOMPLISHING TWO-FACTOR USER AUTHENTICATION USING THE INTERNET

RELATED APPLICATION(S)

This application is a Divisional of U.S. application Ser. No. 10/050,752 filed Jan. 16, 2002 which claims benefit of U.S. Application No. 60/314,810 filed on Aug. 24, 2001. These applications are incorporated herein by reference.

FIELD OF THE INVENTION

This invention relates to a system and method for accomplishing two-factor authentication using the internet.

BACKGROUND OF THE INVENTION

More and more, access to computer networks, web sites and the like is controlled by some type of security procedure. User names and passwords are commonly required for access to sensitive information at web sites. This provides a level of security, but can be breached by several relatively easy means, such as observance of a user or interception of the login signals as they are transmitted over the network or internet.

Token-based security is used typically for employee access to private networks. A token is a non-predictable code derived from both private and public information. The code is unique for each use. Thus, observation or interception of a token code is useless to the party intercepting the code, because by definition the code will not be used a second time. However, anyone who possesses the token generating software or device, by definition has access to the token codes. Thus, token-based security is dependent on possession of or access to software or a token-generating device, and so this security can be fairly easily breached.

SUMMARY OF THE INVENTION

It is therefore an object of this invention to provide a two-factor authentication system and method that uses the internet as the communications medium.

It is a further object of this invention to provide such a system and method that provides an additional layer of security to protect against online identity fraud.

It is a further object of this invention to provide such a system and method that reduces the risk of security breaches from password cracking.

It is a further object of this invention to provide such a system and method that allows a third party to provide additional online security to communications between a consumer and a business over the internet.

If is a further object of this invention to provide such a system and method that allows the consumer to have more control over internet-based security.

This invention results from the realization that increased internet communications security can be accomplished using two-factor authentication in which the user communicates authentication data for both authentication methods to a web site using the internet, and that web site then communicates with another web site to complete the authentication process.

In one embodiment of the invention, a hardware or software token is employed to accomplish one authentication method. The method is preferably accomplished across multiple secure web sites. Users enter data relating to one authentication method (e.g., their username and password). Users also enter data relating to the other authentication method.

For the token-based system, users are provided a token. Once users activate their token, they are required to use the token to authenticate (login) at the web site where the token was activated. A third field can be added to the username and password login page, so that a user can enter the one-time code generated by the token.

The first web site authenticates the user using one authentication method, for example the username and password. The second web site authenticates the user using the second authentication method. In one embodiment, once the first web site successfully authenticates the user using the first authentication method, the first web site transmits to the second web site over the internet user identification data, and the user-entered data relating to the second authentication method. For example, the first web site can transmit the username, the token code and a clientID to the second enabling web site for further authentication. At the second site, the user is authenticated using the second authentication method (e.g., the token). Authentication results are then returned from the second web site to the login web site, which admits or denies entry to the user based on the results of the two authentications.

Broadly, the invention comprises a method of accomplishing two-factor user authentication. The method contemplates the provision of two separate user authentication methods. A user is enabled to communicate authentication data for both authentication methods to a first web site, preferably using the intern et. At least some of the authentication data are communicated using the internet from the first web site to a second web site. Both web sites are involved in user authentication using the authentication data. Preferably, the second authentication method is one which can be used across multiple web sites that support the method, although it is possible to have a unique method (e.g., a one-time passcode) for each web site to be accessed by the user.

The first web site may initially authenticate the user based on the data relating to one of the authentication methods. The second web site may complete user authentication based on the data relating to the other authentication method. The first web site may communicate with the second web site only if the user is initially authenticated. The first web site may communicate to the second web site at least user-identification data, and data relating to the other authentication method.

One authentication method may employ a password. One authentication method may employ a token. The token may be hardware-based, and generate a code that comprises at least some of the data for the authentication method. The token may be a stand-alone, portable hardware device. The token may be embedded in a device such as a cell phone or a personal computer. The token may be USB-based and accessed by a browser. The token may be software-based, and generate a code that comprises at least some of the data for the authentication method. The software token may comprise a browser plug-in.

The second authentication method may comprise a one-time passcode, in some fashion. The one-time passcode can be generated by a hardware token, a piece of stand-alone software (the software token), or a piece of embedded software in a cell-phone or a USB device. However, the second authentication method does not have to be one-time. For example, the PIN used with a bank card is not a one-time PIN.

PKI (Public Key Infrastructure) can be used as the second authentication method as well. The public keys (one per user) would be stored on a server at one of the involved web sites, and the user would login with username-password. An encrypted or signed message would then be sent to the web site using the user's private key. The server would decrypt the message and would OK users who were successfully decrypted. In order to handle this scheme, the first web site would have to have means to receive encrypted messages and then to send them to the second web site for decryption. As an implementation issue, this is more complicated, but conceptually it is within the same idea.

The second authentication method may comprise a one-time passcode, in some fashion. Examples include the following:

1. Fixed simple codes such as a PIN that can be looked up in a database.
2. Fixed complex codes (PKI). Use public key to decrypt privately encrypted message.
3. One-time codes (e.g., a token). Requires a seed value which the token has and the web servers have, and a common algorithm used by the token and the server to generate the next item in a sequence, starting from the seed.
4. Complex, one-time codes. For example, encrypt the token code using PKI, and then decrypt it. This would protect against race attacks, where someone would monitor the network, intercept the one-time pass code, block the code from getting to the web site, then use the code from another browser. If the token code is encrypted with PKI, this cannot be done.

In another embodiment, the invention comprises a method of implementing token-based electronic security across multiple secure web sites, in which the user has a security token, the inventive method comprising storing unique token identification information, and the seed value of each token, in a security system; requiring the user, upon login to a secure web site, to enter at least the code generated by the user's token; passing the user's token code from the web site to the security system; using the security system to verify whether or not the user's token code was generated by the user's token; and passing the verification information from the security system to the web site, for use in web site security.

The requiring step may further require the user to enter a user name and user password. The method may further comprise the step of the web site verifying the user name and user password before passing the user's token code to the security system.

This invention in one embodiment features a method of implementing token-based electronic security across multiple secure web sites, in which the user has a security token, comprising storing unique token identification information, and the seed value of each token, in a security system, requiring the user, upon login to a secure web site, to enter at least the code generated by the user's token, passing the user's token code from the web site to the security system, using the security system to verify whether or not the user's token code was generated by the user's token, and passing the verification information from the security system to the web site, for use in web site security.

The requiring step may further require the user to enter a user name and user password. This method may further comprise the step of the web site verifying the user name and user password before passing to the security system the user's token code.

Featured in another embodiment of the invention is a method of accomplishing two-factor user authentication, comprising providing two separate user authentication methods, enabling a user to communicate authentication data for both authentication methods to a first web site using the internet, enabling the communication of at least some of the authentication data from the first web site to a second web site using the internet, wherein both web sites are involved in user authentication using the authentication data.

In this method, the first web site may initially authenticate the user based on the data relating to one of the authentication methods. The first web site may initially authenticate the user based on the data relating to one of the authentication methods. The second web site may complete user authentication based on the data relating to the other authentication method. The first web site may communicate with the second web site only if the user is initially authenticated. The first web site may communicate to the second web site at least data relating to the other authentication method, and user-identification data.

In this method, one authentication method may employ a password, and one authentication method may employ a token. The token may be hardware-based, and generate a code that comprises at least some of the data for the authentication method. The token may be a stand-alone, portable device. The token may be USB-based, and accessed by a browser. The token may be software-based, and generate a code that comprises at least some of the data for the authentication method. The token may comprise a browser plug-in.

One authentication method may employ a fixed complex code. The fixed complex code may comprise a public key infrastructure. In one embodiment, one authentication method is software-based. At least one user authentication method can be used across multiple web sites. The token may be embedded in a device such as a cell phone.

BRIEF DESCRIPTION OF THE DRAWINGS

Other objects features and advantages will occur to those skilled in the art from the following description of the preferred embodiment, and the accompanying drawings, in which.

DESCRIPTION OF THE PREFERRED EMBODIMENT

Figure 1:
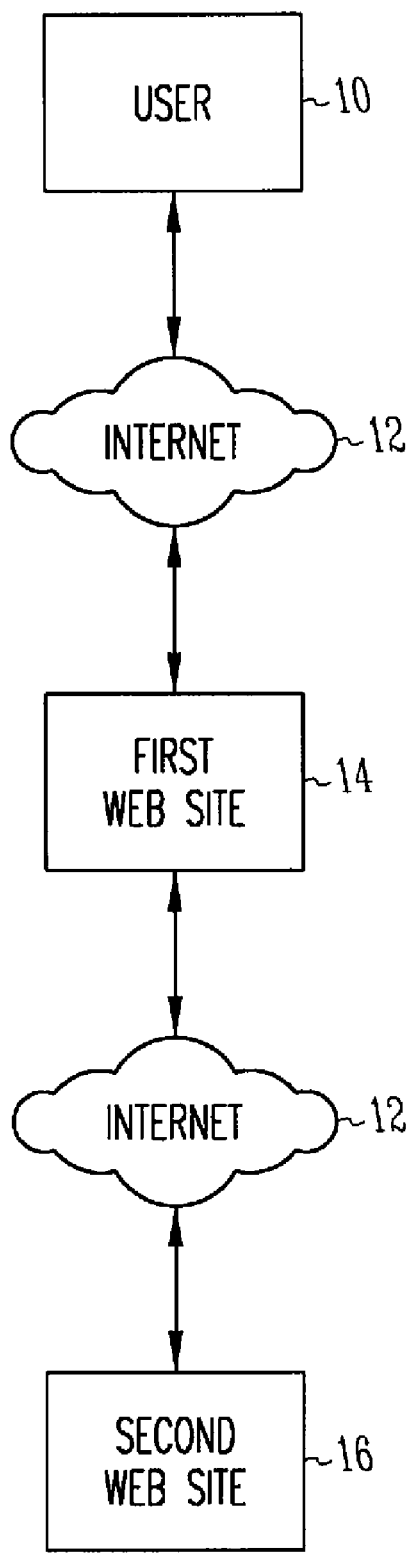
FIG. 1 is a schematic high-level diagram of the system for this invention.

This invention may be accomplished in a method of accomplishing two-factor user authentication over the internet. Two separate user authentication methods are provided. In the preferred embodiment, one method uses a user name and password system, and the other method uses a token-based system. See FIG. 1 for a schematic diagram of a system that can accomplish the invention. The user 12 is required to communicate authentication data for both authentication methods to a first web site 14 using the internet 12. Typically, this web site is the web site of a business with which the user is communicating. An example would be a brokerage account.

One of the authentication methods is accomplished at the first web site 14. Typically, this comprises verification based on the user name and password. The first web site 14 then communicates at least some of the authentication data to the second web site 16, also using the internet 12. For the preferred embodiment, the first web site 14 would transmit to the second web site 16 the token code and an identification of the user resulting from the first authentication method. The second web site 16 would then accomplish the second authentication method to complete authentication of the user. The second web site 16 would then transmit back to the first web site 14 the results of the second authentication, so that the first web site 14 could then accept or deny access to the user.

The following are definitions of several terms used below:

FiPass Authentication Service provided by FiPass Inc. (the assignee herein)

FSS FiPass Secured Site—Any site using the FiPass services and which conforms to certain guidelines.

FiPass Token A 'key ring' sized device similar to a car alarm controller. The token is an existing network security device that produces a unique code each time it is used.

End User A customer that utilizes the FiPass Authentication system at any FSS

Billed User An End User who is responsible for the cost of the FiPass Authentication System Pre-Paid User An End User who is not responsible for the monthly charge or the shipping charge of the initial FiPass token FiPass Code The code produced by the FiPass token when the user presses the button, used to authenticate FiPass Users.

FiPass Web Site The software located at www.fipass.com, which is the public FiPass, Inc. web site. The FiPass Web Site includes pages that allow FiPass Users to change their personal information.

FiPass Server The software component located at secure.fipass.com, used for the FiPass Authentication System.

FiPass Client The software component located at the FSS used to collect FiPass User information and to communicate that information with the FiPass Server. Can be in form of a COM object or JAVA Bean or other server side code (pert . . . ), also can run on any platform that can communicate over HTTPS.

Billing The Software component used by FiPass to communicate with the Credit Card processor.

Fulfillment The Software component used by FiPass to communicate with the token fulfillment provider, to package and ship tokens to end users.

System Features:

System Features Supported:

The inventive FiPass system will support the following Solution Model Use Cases. The description also details the methodology in this invention that accomplishes the preferred token-based security for the second authentication method.

| | Action | Description |
|---|---|---|
| 1. | Online service network administrator and FiPass admin setup service. | The FiPass client software must be installed on the FSS web site and the FSS must be enabled at FiPass. |
| 2. | End User enrolls in FiPass. | The End User decides to utilize the FiPass authentication system and enrolls by filling out an online form. |
| 3. | FSS performs a batch enrollment of multiple End Users. | Any FSS may choose to underwrite the FIPass authentication system and enroll multiple users at once. |
| 4. | End User receives confirmation email along with confirmation number. | After an End User successfully enrolls with FiPass, an email with a confirmation number is sent to the End User. |
| 5. | End User is flagged for Fulfillment. | End user is set to receive a new token in the mail. |
| 6. | FiPass network administrator adds tokens to FiPass database. | When tokens are fulfilled, the token serial numbers along with the seed value for each SN must be entered in the database. |
| 7. | End User receives the token in the mail. | After the enrollment process is completed, the End User receives the token in the mail. |
| 8. | End User activates token. | Once the token has been received, it must be activated before it can be used. |
| 9. | End User activates token at another FSS | Once enrolled with FiPass at one FSS, tokens may be used at any FSS where End Users have accounts. |
| 10. | End User activates replacement token | After an End User receives a replacement token, it is activated at www.fipass.com. |
| 11. | FSS software modifieds Und User's login requirements. | FSS database must be modified to show that the End User is required to login using the FiPass authentication system. |
| 12. | End User authenticates using FiPass system. | After the End User activates the token, authentication takes place using the inventive FiPass system. |
| 13. | End User modifies personal information at FiPass com. | An End User can modify personal information such as Billing Address, etc. |
| 14. | FiPass corrects mandatory billing failure | The FiPass system attempts to correct failed charges that are considered mandatory. |
| 15. | FiPass CSR assists an End User. | An End User can receive a defective token or need help in using the FiPass system; the CSR is there to provide assistance. |
| 16. | FiPass CSR request alternative billing info after failure of a discretionary charge. | If a billing process fails while the user is on the phone with a CSR, the CSR will request alternative billing info. |
| 17. | FiPass CSR request alternative billing info after failure of a mandatory charge. | If a billing process fails while the user is on the phone with a CSR, the CSR will request alternative billing info. |
| 18. | End User loses FiPass Token. | If an End User loses a token, it will need to be replaced. |
| 19. | FiPass bills users for the FiPass Authentication Service. | FiPass bills users for the FiPass Authentication Service, as well as shipping costs and replacement token fees (if applicable). |
| 20. | End User deactivates the FiPass authentication system at a particular FSS. | The End User can deactivate the FiPass system at any FSS while it is still activated at another FSS. |
| 21. | End User cancels the FiPass authentication system. | The End User can cancel the FiPass system if all his or her FSS accounts have been deactivated. |
| 22. | FiPass Management gets | For business analysis purposes, |

-continued

| | Action | Description |
|---|---|---|
| | reports. | FiPass management needs to get reports on web site usage and the growth in FiPass accounts. |
| 23. | User Returns Defective Token | If users receive a defective token or the token become inoperable, it will need to be replaced. |
| 24. | User Reinstates cancelled account | If user's account has been cancelled due to a billing failure and was unaware of the failed charge, the account can be reinstated. |

Authentication

Figure 2:
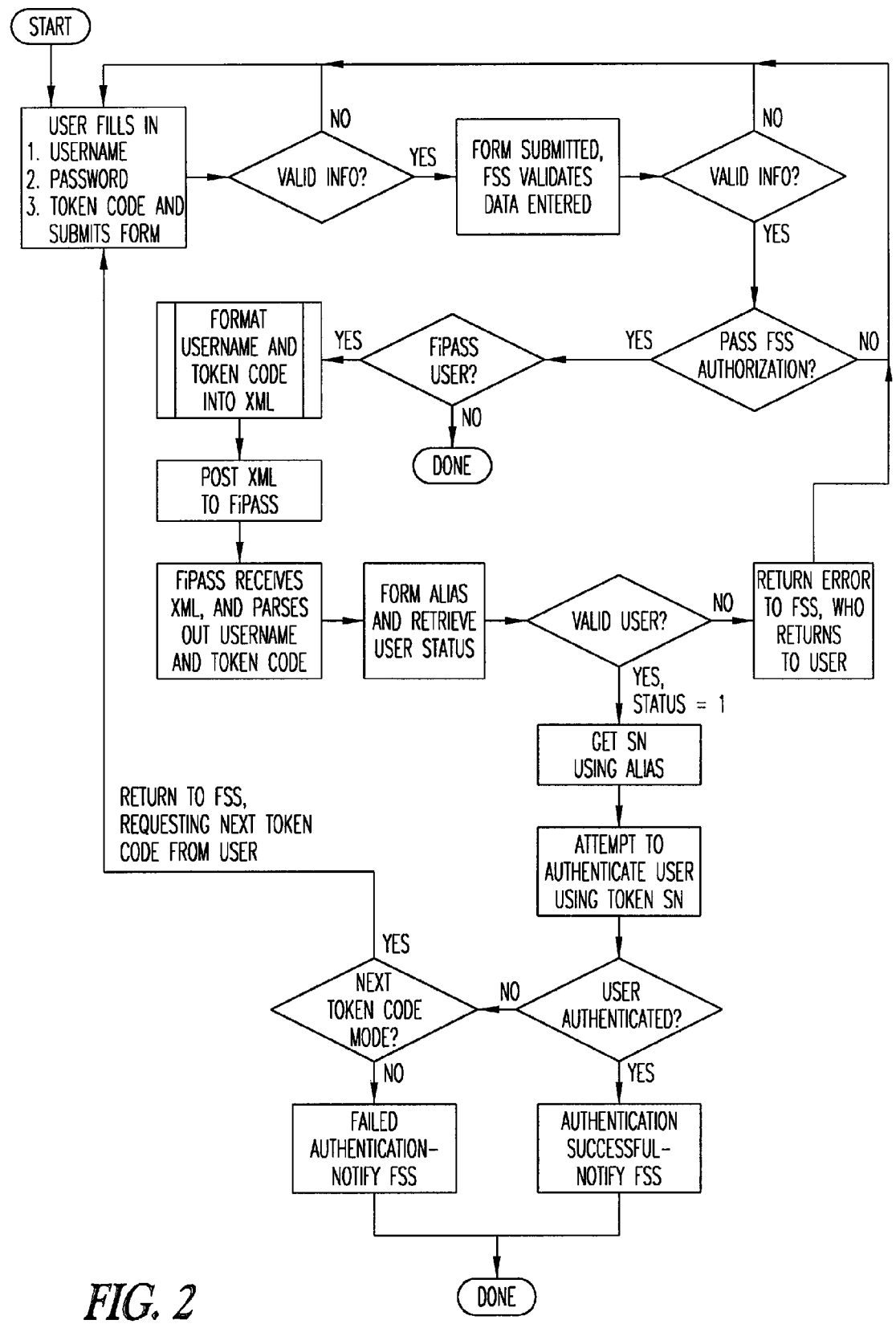
FIG. 2 is a flow chart of the preferred login process for the invention.
Figure 3:
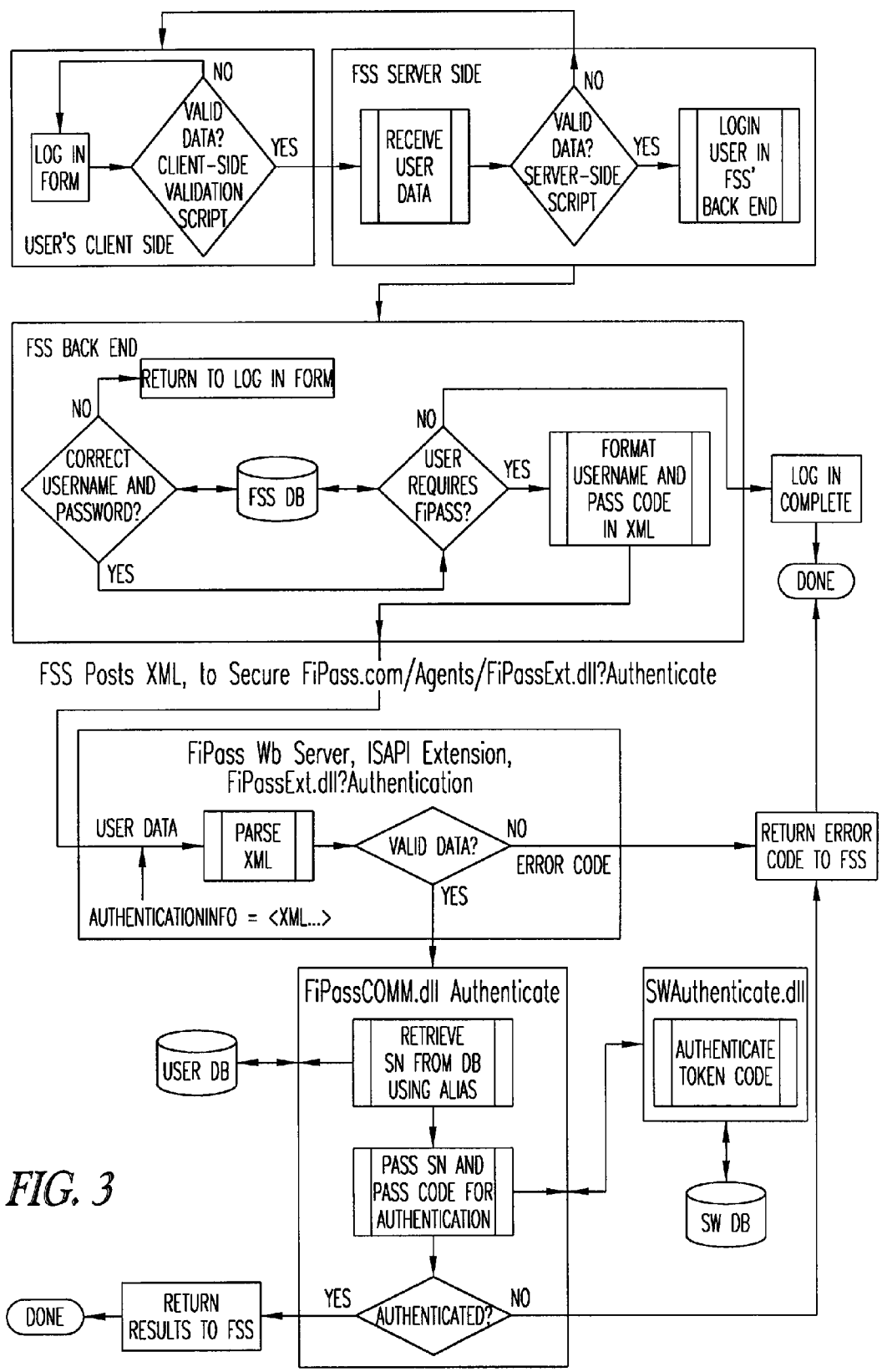
FIG. 3 is a flow chart of the preferred overall authentication process for the invention.

Two-factor authentication is the main piece of the inventive system and method. Authentication takes place at both the FSS client side and server side, as well as at FiPass. FIGS. 2 and 3 detail the preferred authentication process. The user enters in his/her username, password, and one-time pass code in the login form at the FSS. Client side script validates the data entered and then the information is submitted to the FSS. The FSS authenticates the user using the username and password. Once the FSS has determined that the password belongs to that user, the FSS then determines if the user requires FiPass for further authentication. If so, the FSS formats the data in XML and posts that data to Secure.FiPass.com. An ISAPI extension is installed on the web servers, which receives the request for authentication and parses the XML and passes it to the business object. The business object determines the token SN by passing the user's username to a stored procedure which looks it up in the user database. The token SN and the one-time pass code are passed to the authentication object, SWAuthenticate.dll, to authenticate the user. The SWAuthenticate.dll object wraps the functionality of the libswecapi2.dll, which has all the functionality needed to access the SW DB for authenticating. SWAuthenticate.dll utilizes all that functionality and is abled to be called from other objects that can make use of that functionality for the authentication process.

Figure 4:
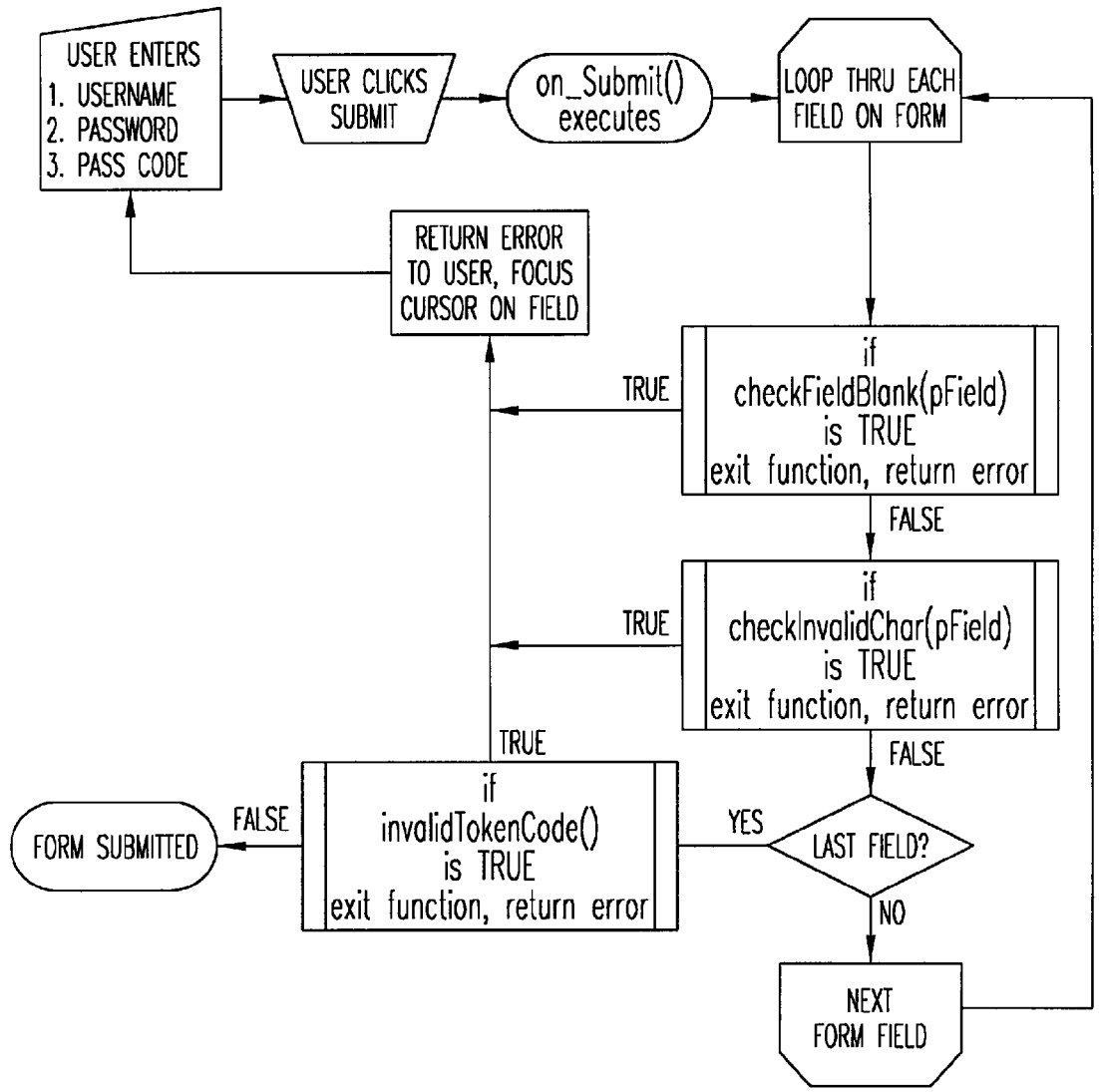
FIG. 4 is a more detailed flow chart of the client side authentication object of the authentication process of FIG. 3.

The separate objects required for authentication are listed just below, and further described below.
   Client Side Authentication
   FSS Server Side Authentication
   FiPassExt.dll?Authenticate
   FiPassCOM.dll
   SWAuthenticate.dll Client Side Authentication (See FIG. 4)

Authentication begins when users log in at the FSS. Users enter their username, password and one-time pass code into the log in form and click the submit button. When the button is clicked, client side java script executes validating the data. If any data is invalid, the form is not submitted and the cursor is located on the field with invalid data. Valid data is submitted to the FSS where the FSS Server Side Authentication takes place and returns the user to the log in form if any data is invalid.

Figure 5:
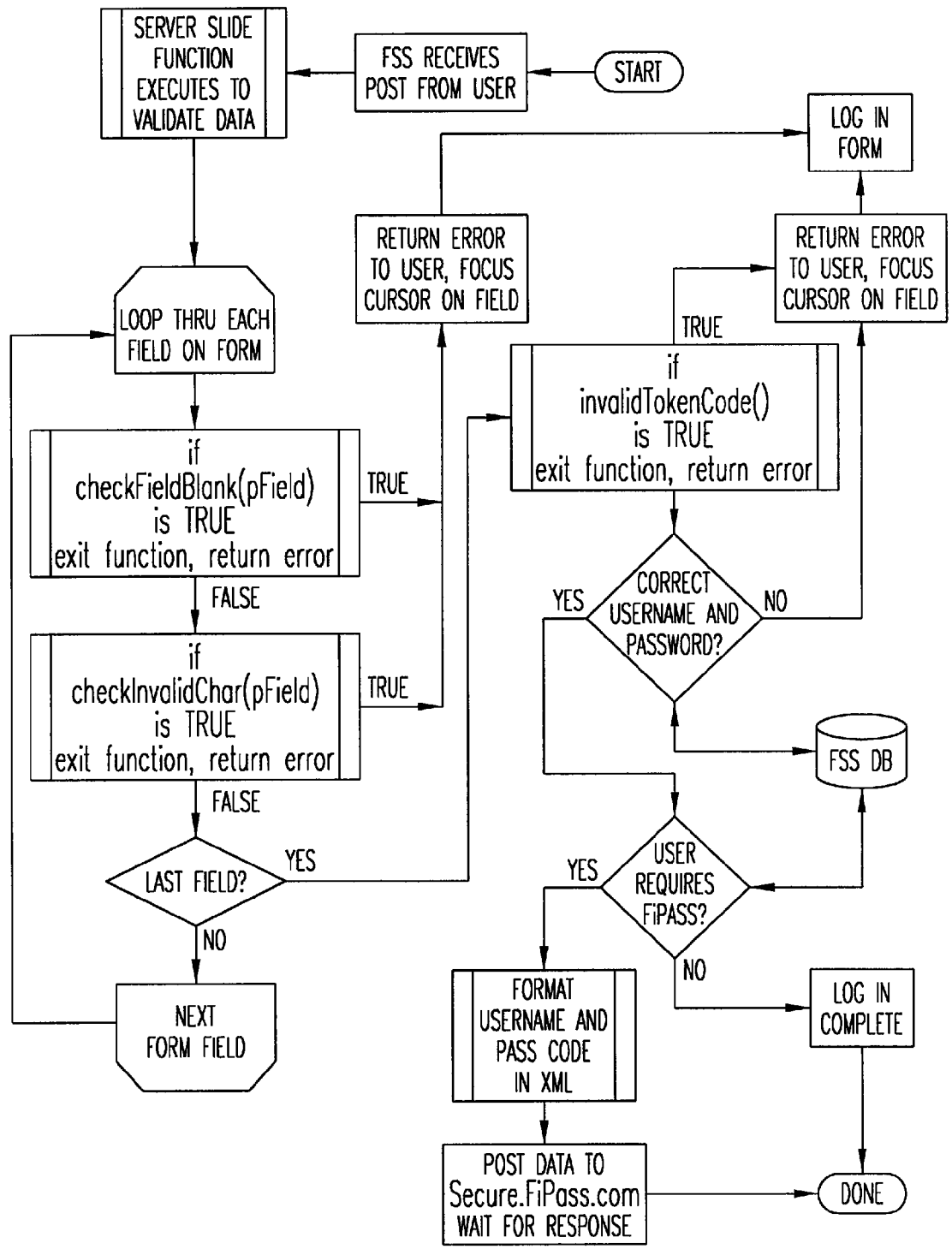
FIG. 5 is a more detailed flow chart of the server side authentication object of the authentication process of FIG. 3.

FSS Server Side Authentication (see FIG. 5)

When the user has successfully entered in valid data in the log in form at the FSS, the FSS will also validate the data entered by the user similar to the client side script. The FSS then authenticates the user using their normal method (username and password). Once the FSS authenticates the user, the FSS then checks if the user requires FiPass. If no FiPass is required then the user proceeds into the web site. However, if FiPass is required for the user, the FSS formats the username, one-time pass code and ClientID in XML and posts it to Secure.FiPass.com. The data is then posted using 1 parameter
   1. authenticationinfo
   for example,
   https://secure.fipass.com/agents/fipassext.dll?Authentication?authentication info=<?xml version=1.0 standalone=yes?><authenticationinfo> . . . .

After the data is sent to Secure.FiPass.com, the FSS will wait for the results in the form of a response from Secure.FiPass.com.

FiPassExt.dll?Authenticate

The authentication data that is received by Secure.FiPass.com is in the form of 1 parameter using a name value pairs and is sent using the standard HTTP 'post' method. An ISAPI extension (see FIG. 6) is installed on the web servers, which receive the requests. In order to receive specific fields and field types, the ISAPI extension must know what fields it is going to receive and their variable types. This is done in the command-parsing map, located in a file that is generated by the wizard. The following lines must be added in order to receive the specific parameters sent by the FSS:
   ON_PARSE_COMMAND(Authenticate, FiPassExtension, ITS_PSTR)
   ON_PARSE_COMMAND_PARAMS("AuthenticateInfo")

The first line tells IIS and the ISAPI extension (the class FiPassExtension) the "Authenticate" function is to be executed when a request has been received and 2 parameters of type integer and string will be sent in the request. The second line defines the parameter names that will be sent as part of the request.

Once the data is received from the FSS, it must be checked for validity before further processing. If the data is not in a valid form, then a response specifying the invalid data will be sent to the FSS immediately and no other processing will take place. The Authenticate method does this validation, along with calling the business object, FiPassCOM.Authenticate to authenticate the user.

Figure 7:
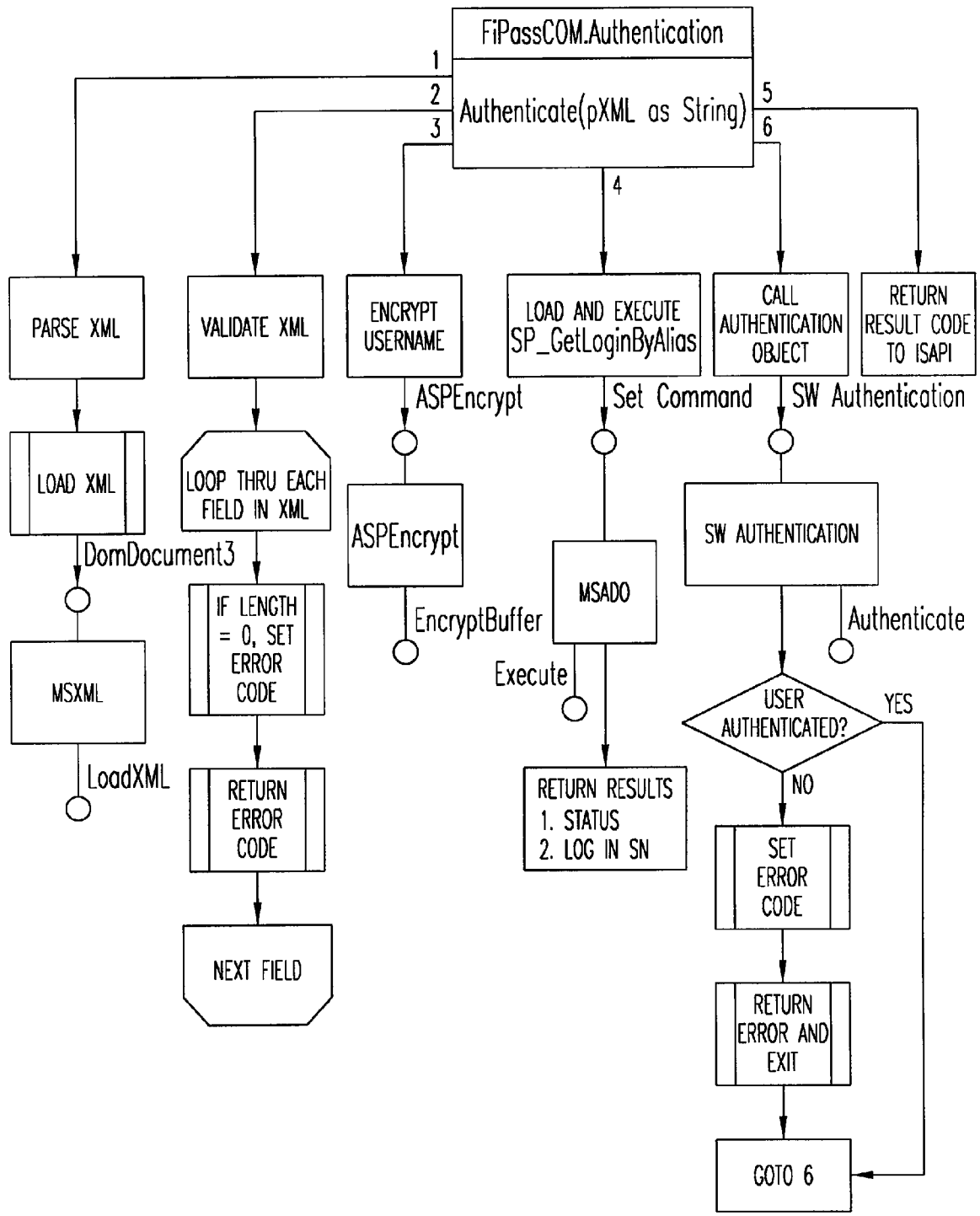
FIG. 7 is a more detailed flow chart of the authentication COM functionality object of the authentication process of FIG. 3.

When the FSS makes a request to Secure.Fipass.com, IIS first receives that request and then calls the Authenticate function that exists in the FiPassExt.dll extension. IIS passes the function a pointer to CHTTPServerContext and the XML string that was sent by the FSS. The pointer is used to communicate back and forth with IIS, which communicates back and forth with the FSS. In the ISAPI extension, the function declaration has 2 parameters, a pointer to the CHTTPServerContext, so it can communicate back to IIS after the processing is completed, and the XML parameter sent from the FSS.
   Below is a list of requirements for this function.
   To parse the XML that is received
   After parsing, each XML tag set that holds a piece of required data is checked for blank values
   If any required fields are blank, an error code is immediately returned to the FSS and no further processing will take place.
   If all fields are valid, the Authentication object (located in FiPassCOM.dll) is called and is passed the XML string received from the FSS
   The Authentication object performs its task (see FiPassCOM.dll and returns its results (pass or fail) to the ISAPI extension and IIS, who passes it back to the FSS FiPassCOM.dll (see FIG. 7)

When requests are made to Secure.FiPass.com for authentication, the ISAPI extensions validate the data and pass off the valid XML to business objects, which carry out the request. FiPassCOM.dll holds all the objects, which carry out all the requests FSS' can make. Each object is in the form of a class within the FiPassCOM.dll. Each class has a specific task. The authentication functionality will take place in the Authentication class. The Authentication class contains the method called Authenticate, which requires the following functionality.

Receive XML string from ISAPI extensions.
Parse XML and set local variables
Call SP_GetLoginbyAlias and pass it the username and ClientID, which is used to retrieve the token SN to be used to authenticate the user
The result from SP_GetLoginbyAlias is returned to the Authentication object which then calls SWAuthenticate to do the authentication
The results from SWAuthenticate are returned back to the Authentication object (FiPassCOM.dll) which passes it back to the ISAPI extension and IIS, who passes it back to the FSS All requests made by an FSS will utilize the user database. The FiPassCOM.dll object handles all user database access depending on the request. Using the MS ADO object, stored procedures are executed, which are compiled and running inside the database process.

Figure 8:
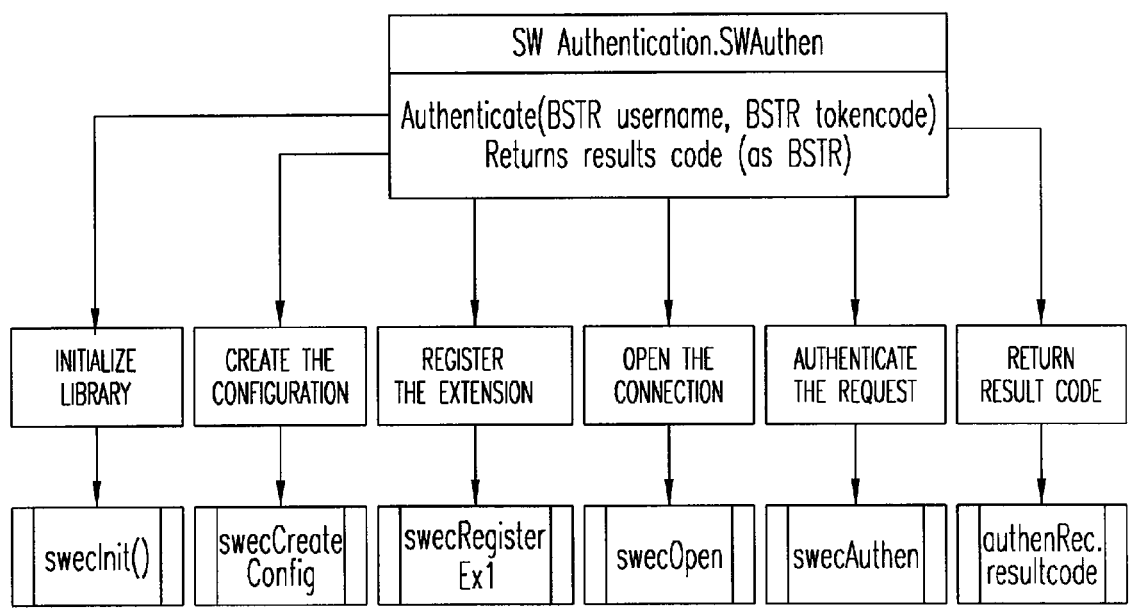
FIG. 8 is a more detailed flow chart of the token code authentication object of the authentication process of FIG. 3.

SWAuthenticate.dll (see FIG. 8)

The object used to communicate with the SW DB is SWAuthenticate.dll. This object wraps the functionality that is required to access the SW DB and authenticate users. It is called from the business objects and always receives 2 strings, the token SN and the one-time pass code, and returns one string, which is either pass or fail.

Other embodiments will occur to those skilled in the art and are within the scope of the claims.

What is claimed is:

1. A method of implementing token-based electronic security across multiple secure web sites, in which a user has a security token, wherein the security token authenticates its user based on a first authentication factor, comprising:
storing unique token identification information, and a seed value of each security token, in a security system on a token authenticating web site;
requiring the user, upon login to a secure web site, to enter at least a token code generated by the user's security token and data corresponding to a second authentication factor different from the first authentication factor;
authenticating the user based on the second authentication factor using the secure web site;
passing the user's token code from the secure web site to the security system on the token authenticating web site if the authenticating is successful;
verifying whether or not the user's token code was generated by the user's token using the security system on the token authenticating web site; and
passing a result of the verifying from the token authenticating web site, to the secure web site, to authorize access to services provided by the secure web site.

2. The method of claim 1, wherein the data corresponding to a second authentication factor includes a user name and user password.

3. The method of claim 1, wherein the security token is a software-based token.

4. A method of implementing token-based electronic security across a plurality of secure web sites, including a first and a second secure web site, the method comprising:
providing a security token to each user, wherein the security token authenticates its user based on a first authentication factor;
storing unique token identification information, and a seed value of each security token, in a security system on a token authenticating web site;
providing each of the plurality of secure web sites with access to the security system on the token authenticating web site;
requiring the user, upon login to one of the plurality of secure web sites, to enter into the secure web site at least a token code generated by the user's security token and data corresponding to a second authentication factor different from the first authentication factor;
authenticating the user based on the second authentication factor using the secure web site;
passing the user's token code from the secure web site to the security system on the token authenticating web site if the authenticating is successful;
generating verification information indicating whether the user's token code was generated by the user's token using the security system on the token authenticating web site; and
passing the verification information from the token authenticating web site to the secure web site, authorize access to services provided by the secure web site.

5. The method of claim 4, wherein the data corresponding to a second authentication factor includes a user name and password.

6. The method of claim 4, wherein the security token is a software-based token.

7. The method of claim 4, wherein storing unique token identification information, and the seed value of each security token, in a security system on a token authenticating web site includes entering the unique token identification information into one of the plurality of secure web sites and forwarding the unique token identification information from the secure web site to the security system on the token authenticating web site.

8. In a system in which each user has a security token, wherein the security token generates a token code and authenticates its user based on a first authentication factor, a method of implementing token-based electronic security, the method comprising:
providing a secure web site;
connecting the secure web site to a third party security system on a token authenticating web site;
storing unique token identification information associated with the security token for each user, and a seed value of each security token, in the third party security system on the token authenticating web site;
requiring the user, upon login to the secure web site, to enter into the secure web site at least the token code generated by the user's token and data corresponding to a second authentication factor different from the first authentication factor;
authenticating the user based on the second authenticating factor using the secure web site;
passing the user's token code from the secure web site to the security system on the token authenticating web site if the authenticating is successful;
receiving from the token authenticating web site and at the secure web site, verification information indicating if the user's token code was generated by the user's security token; and authorizing the user to access services provided by the secure web site as a function of the verification information.

9. The method of claim 8, wherein the data corresponding to a second authentication factor includes a user name and user password.

10. The method of claim 8, wherein the security token is a software-based token.

11. The method of claim 8, wherein storing unique token identification information, and the seed value of each security token, in the third party security system on the token authenticating web site includes entering the unique token identification information into the secure web site and forwarding the unique token identification information from the secure web site to the security system on the token authenticating web site.

12. A method of strengthening authentication of a user accessing a service web site, wherein the service web site includes a first factor authentication, comprising:
   connecting the service web site to a security web site;
   configuring the service web site to add a second factor authentication to the first factor authentication, wherein configuring includes adapting the service web site to forward data corresponding to the second factor authentication to the security web site and to receive an authentication result from the security web site;
   receiving a service request from the user at the service web site, wherein receiving a service request includes receiving data corresponding to the first authentication factor of the user and data corresponding to the second authentication factor of the user, wherein the second authentication factor is different from the first authentication factor;
   authenticating the user using the data corresponding to the first authentication factor at the service web site;
   sending a request for the second factor authentication from the service web site to the security web site if the authenticating based on the first authentication factor is successful, wherein sending a request includes transferring the data corresponding to the second authentication factor;
   authenticating, in receipt of the request, the user using the data corresponding to the second authentication factor received from the service web site at the security web site;
   returning a result of the authentication based on the second authentication factor from the security web site to the service web site; and
   determining, at the service web site, whether to authorize the user to access services provided by the service web site according to the result of the authentication returned from the security web site.

13. The method of claim 12, wherein the data corresponding to the first authentication factor is a username and password for the user.

14. The method of claim 12, wherein the data corresponding to the second authentication factor is a token code generated by a security token distributed to the user.

15. The method of claim 14, wherein the security token is a software-based token.

16. The method of claim 12, wherein sending a request for the second factor authentication further includes checking, at the service web site, whether the second factor authentication is requested by the user.

17. The method of claim 12, wherein sending a request for the second factor authentication further includes transferring at least some of the data corresponding to the first authentication factor.

18. The method of claim 12, wherein authenticating the user using the second authentication factor at the security web site includes validating information in the request for the second factor authentication received from the service web site.

19. A system for strengthening authentication of a user requesting one or more services, comprising:
   a security web site;
   a plurality of service web sites, wherein each service web site is connected across a network to the security web site, wherein the service web sites provide services accessible by the user, and wherein each service web site is configured to:
      receive, from the user, a service request, wherein the service request includes data corresponding to a first authentication factor of the user and data corresponding to a second authentication factor of the user, wherein the second authentication factor is different from the first authentication factor;
      authenticate the user using the data corresponding to the first authentication factor; and
      forward a request for second authentication factor authentication if authentication based on the first authentication factor is successful;
   wherein the security web site is configured to:
      receive the request for second factor authentication of the user from one of the service web sites, wherein the request includes the data corresponding to the second authentication factor of the user;
      authenticate, on receipt of the request, the user using the data corresponding to the second authentication factor received from the service web site; and
      return a result of the authentication based on the second authentication factor to
   the requesting service web site; and
   wherein the requesting service web site receives the result from the security web site and uses the result to authorize access to services provided by the requesting service web site.

20. The system of claim 19, wherein the data corresponding to the first authentication factor is a username and password for the user.

21. The system of claim 19, wherein the data corresponding to the second authentication factor is a token code generated by a security token distributed to the user.

22. The system of claim 21, wherein the security token is a software-based token.

23. The system of claim 19, wherein the service web site is further configured to check whether the second factor authentication is requested by the user.

24. The system of claim 19, wherein the security web site is further configured to transfer at least some of the data corresponding to the first authentication factor to the security web site.

25. The system of claim 19, wherein the security web site is further configured to validate information in the request for the second factor authentication received from the service web site.

* * * * *

UNITED STATES PATENT AND TRADEMARK OFFICE
CERTIFICATE OF CORRECTION

PATENT NO. : 7,516,483 B2
APPLICATION NO. : 11/678921
DATED : April 7, 2009
INVENTOR(S) : Brennan It is certified that error appears in the above-identified patent and that said Letters Patent is hereby corrected as shown below:

Title Page; On Page 2, in field (56), under "Other Publications", in column 2, line 10, delete "HAll," and insert -- Hall, --, therefor.

On Sheet 5 of 8, in Fig. 5, line 1, delete "SLIDE" and insert -- SIDE --, therefor.

Figure 6:
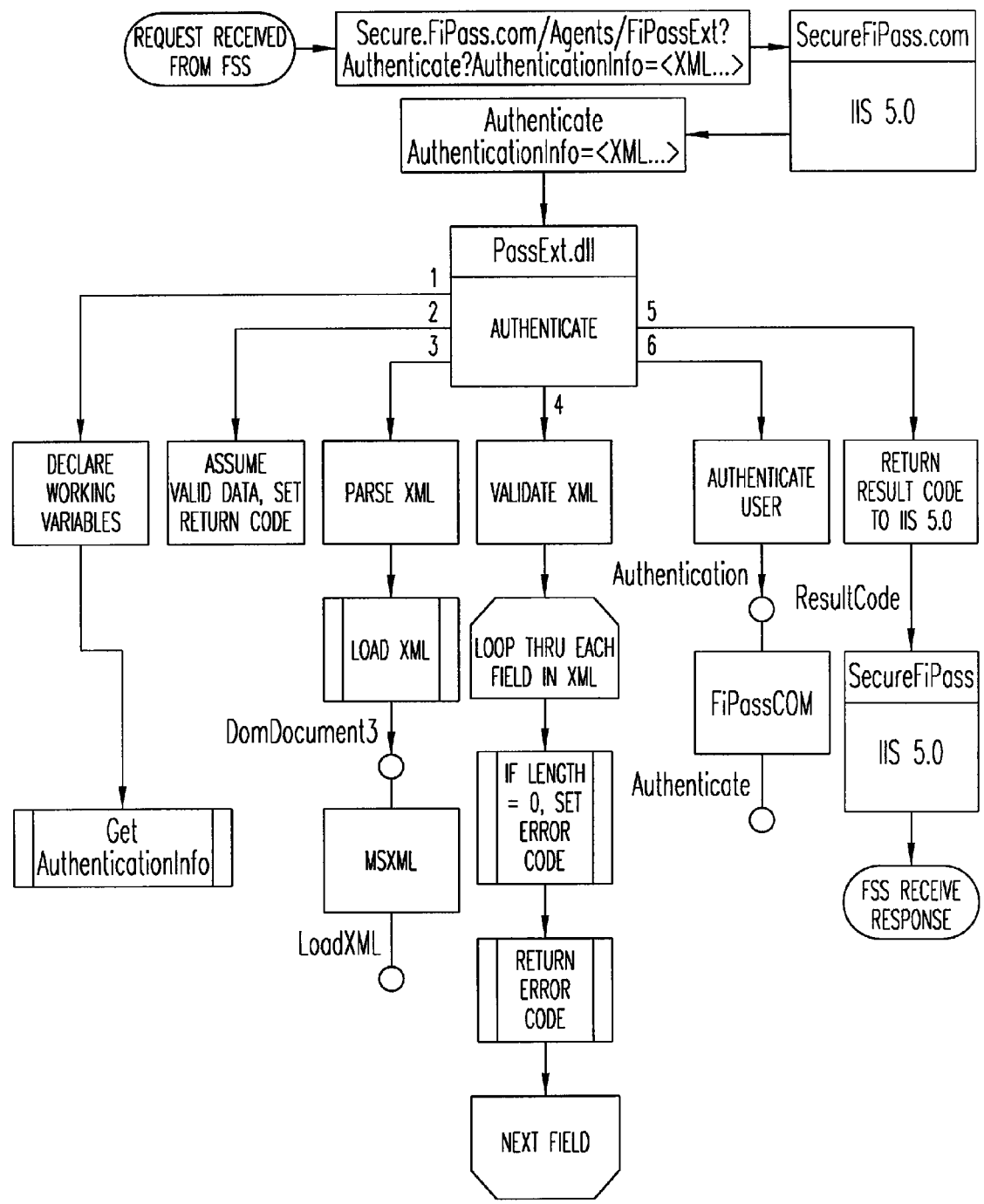
FIG. 6 is a more detailed flow chart of the authentication ISAPI extension object of the authentication process of FIG. 3.

On Sheet 6 of 8, in Fig. 6, line 1, delete "SecureFiPass.com" and insert -- Secure.FiPass.com --, therefor.

In column 1, line 21, delete "User names" and insert -- Usernames --, therefor.

In column 2, line 18, delete "clientID" and insert -- ClientID --, therefor.

In column 2, line 30, delete "intern et." and insert -- internet. --, therefor.

In column 3, line 41, delete "user name" and insert -- username --, therefor.

In column 3, line 42, delete "user name" and insert -- username --, therefor.

In column 3, line 58, delete "user name" and insert -- username --, therefor.

In column 3, line 59, delete "user name" and insert -- username --, therefor.

In column 4, line 62, delete "user name" and insert -- username --, therefor.

In column 5, line 6, delete "user name" and insert -- username --, therefor.

In column 5, lines 38-39, delete "secure.fipass.com," and insert -- Secure.FiPass.com, --, therefor.

In column 6, line 9, delete "FIPass" and insert -- FiPass --, therefor.

In column 6, line 32, delete "Und" and insert -- End --, therefor.

In column 6, line 39, delete "FiPass com." and insert -- FiPass.com --, therefor.

In column 8, lines 61-62, delete "(see FiPassCom.dll" and insert -- (see FiPassCom.dll) --, therefor.

UNITED STATES PATENT AND TRADEMARK OFFICE
CERTIFICATE OF CORRECTION

PATENT NO. : 7,516,483 B2
APPLICATION NO. : 11/678921
DATED : April 7, 2009
INVENTOR(S) : Brennan It is certified that error appears in the above-identified patent and that said Letters Patent is hereby corrected as shown below:

In column 9, line 58, in Claim 1, delete "site," and insert -- site --, therefor.

In column 9, line 61, in Claim 2, delete "user name" and insert -- username --, therefor.

In column 10, line 26, in Claim 4, delete "site," and insert -- site, to --, therefor.

In column 10, line 29, in Claim 5, delete "user name" and insert -- username --, therefor.

In column 11, line 5, in Claim 9, delete "user name" and insert -- username --, therefor.

In column 12, line 39, in Claim 19, delete "the requesting service web site; and" and insert the same as a continuation on Col. 12, Line 38.

In column 12, line 45, in Claim 20, delete "usemame" and insert -- username --, therefor.

In column 12, line 55, in Claim 24, delete "security" and insert -- service --, therefor.

Signed and Sealed this

Twenty-first Day of July, 2009

JOHN DOLL
*Acting Director of the United States Patent and Trademark Office*